H. D. REY.
VEHICLE WHEEL.
APPLICATION FILED JUNE 25, 1918.
1,333,680.
Patented Mar. 16, 1920.
3 SHEETS—SHEET 1.
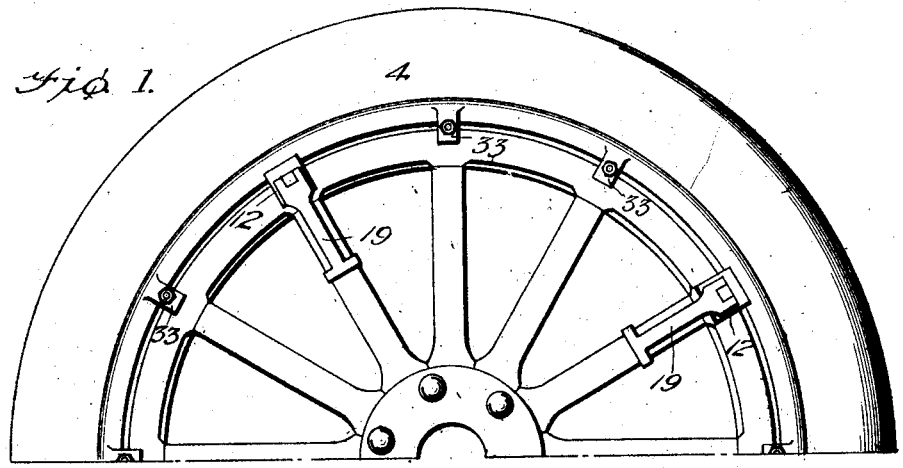
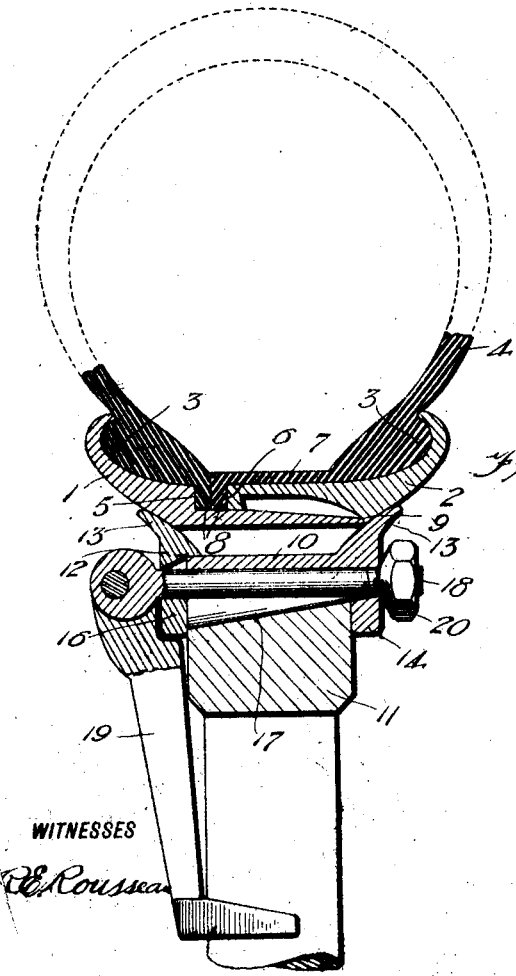
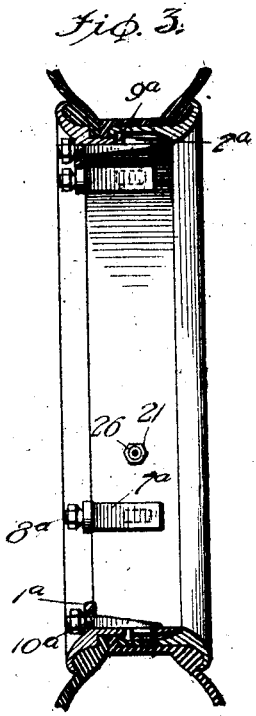
WITNESSES
INVENTOR
Henri D. Rey.
BY
ATTORNEYS

H. D. REY.
VEHICLE WHEEL.
APPLICATION FILED JUNE 25, 1918.

1,333,680.

Patented Mar. 16, 1920.
3 SHEETS—SHEET 2.

WITNESSES
R. D. Rousseau

INVENTOR
Henri D. Rey,
BY Munn & Co
ATTORNEYS

H. D. REY.
VEHICLE WHEEL.
APPLICATION FILED JUNE 25, 1918.
1,333,680.
Patented Mar. 16, 1920.
3 SHEETS—SHEET 3.
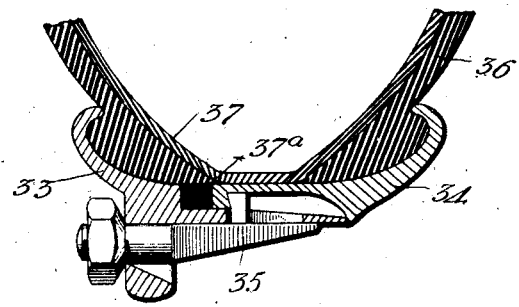
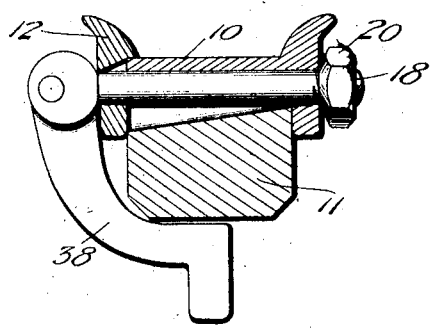
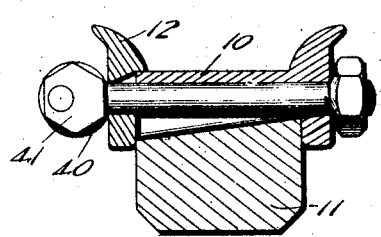
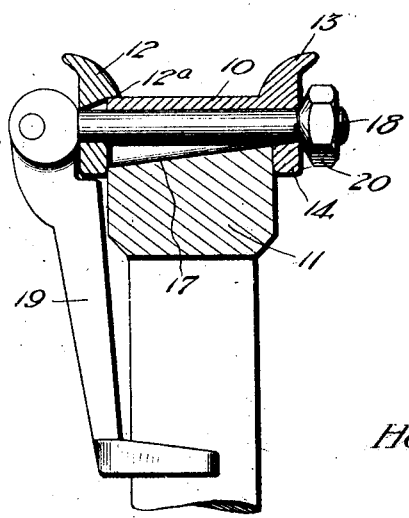
WITNESSES
INVENTOR
Henri D. Rey
BY
ATTORNEYS

UNITED STATES PATENT OFFICE.

HENRI DANIEL REY, OF AVARUA, ISLAND OF RAROTONGA, COOK ISLANDS, NEW ZEALAND.

VEHICLE-WHEEL.

1,333,680.          Specification of Letters Patent.      Patented Mar. 16, 1920.

Application filed June 25, 1918. Serial No. 241,770.

*To all whom it may concern:*

Be it known that I, HENRI D. REY, a citizen of the Republic of France, and a resident of Avarua, in the Island of Rarotonga, one of the Cook Islands, within the boundaries of New Zealand, have invented certain new and useful Improvements in Vehicle-Wheels, of which the following is a specification.

My invention is an improvement in vehicle wheels, and has for its object to provide mechanism in the form of an auxiliary rim for permitting pneumatic tires to be easily and quickly attached to or detached from the wheel, and for sealing the abutting edges of the shoe or casing to provide a closed tube that may be inflated directly, and to provide means for mounting the auxiliary rim in the same manner that a quick demountable rim is mounted.

In the drawings:

Figure 1 is a partial side view of a wheel provided with the improved rim;

Fig. 2 is a transverse section;

Fig. 3 is a diametrical section through the auxiliary rim;

Fig. 7 is a view similar to Fig. 6 showing the rim with a tire having an inner tube;

Figs. 8, 9 and 10 are sectional views of other embodiments of the rim.

Figure 4:
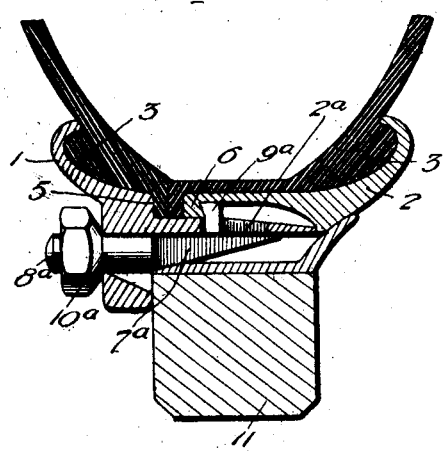
Fig. 4 is a sectional view at one of the clamping means for the auxiliary rim section.

In the embodiment of the invention shown in Figs. 1 to 5, the demountable rim consists of sections 1 and 2, each of which has the usual hooked flange for engaging the holding rib 3 of the shoe or casing 4, and these ribs are arranged in the usual relative position with respect to the shoe or casing.

Each section of the auxiliary rim has a surface which is adapted to coöperate with a similar surface on the other section to clamp between them portions of the shoe or casing to seal said shoe or casing, these surfaces 5, and 6 being for the section 1 an annular inwardly facing shoulder, and for the section 2 an inwardly extending radial flange 6. One side edge of the shoe or casing has an extension 7, which extends across the rim into abutting relation with the other section, and both sections have radial marginal flanges 8, which are adapted to be received between the surfaces 5 and 6 and to be clamped therebetween to seal the shoe or casing.

The rib 6 of the section 2 engages the outer face of the section 1, and that edge of the section 1 remote from the hooked flange is adapted to abut against an annular rib 9 of the section 2, to limit the movement of the sections toward each other.

The auxiliary rim sections 1 and 2 are clamped together on the shoe or casing by means of wedge shaped bars $7^a$. Each of these bars has a threaded stem $8^a$ at its large end, and near the other end there is an upstanding lug $9^a$, which is adapted to pass through a slot $2^a$ in the section 2 of the auxiliary rim to engage behind the rib 6, as shown in Fig. 4. The stem of each member $7^a$ passes through an opening in an inwardly extending radial lug $1^a$ of the section 1, and is engaged outside thereof by a nut $10^a$.

Referring to Fig. 4 it will be noticed that the opening of each lug $1^a$ is tapering, being of greater size at the inner face of the lug, so that the wedge shaped bar may swing inwardly at its inner end to release the lug $9^a$.

Referring to Fig. 4 it will be noticed that that face of the rib 6 which is remote from the shoulder 5 is inclined, or under cut, and the lug $9^a$ of the bar $7^a$ is shaped to fit this under cut face.

In the construction of Figs. 1 and 2, the sections of the auxiliary rim are supported by a main rim 10 which seats upon the felly 11, and by holding plates 12, to be described. At one side edge the rim 10 has an outwardly curving flange 13, upon which the section 2 of the auxiliary rim seats; and the outer ends of the holding plates are curved outward in the same manner for engagement by the section 1 of the auxiliary rim. Each of these holding plates 12, has a shoulder $12^a$ which engages the outer face of the rim 10 at that edge remote from the flange 13, and each plate extends inwardly along the felly 11 at the opposite face from the inwardly extending flange 14 of the section 10.

At each of the holding plates 12, the felly has a transverse opening 17, through which is passed a bolt 18, the bolt engaging also openings in the flange 14 of the rim 10, and an opening in the adjacent holding plate. Opening 17, as shown, is gradually increased in that diameter which is radial to the wheel from the flange 14 to the holding plate 12, and the openings in the flange 14 and in the holding plate are similarly shaped or tapered increasing in diameter, however, from without inwardly. Each bolt 18 has at one end a head, and the other end is engaged by a nut 20, and a cam lever 19 is pivoted to the head of each bolt. Each of these cam levers has a cam for engaging the adjacent holding plate, the arrangement being such that when the lever is swung outwardly, the low portion of the cam will contact with the outer face of the holding plate, while when the cam is swung in the position of Fig. 8, the high portion of the cam will contact with the holding plate, and will force the holding plate toward the rim.

When the lever is swung outwardly, the holding plates 12 are sufficiently loosened to permit the shoulders 12$^a$ to move inward beyond the edge of the rim, the movement of the bolt 18 being permitted by the shape of the opening 17, and by the shape of the openings in the flange 14 and in the holding plates. That end of the lever 19 remote from the cam is forked as shown, so that it may engage about a spoke as shown in Figs. 1 and 8.

Figure 5:
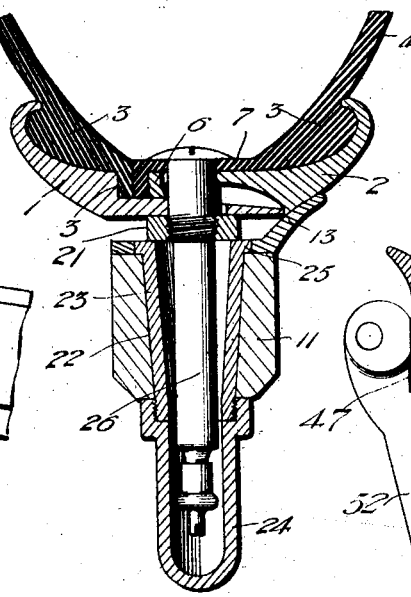
Fig. 5 is a view similar to Fig. 4 taken at the valve.

In Fig. 5 is shown the manner of arranging the air valve and of connecting it to the shoe or casing. The valve is connected to the extension 7 passing through an opening in the extension and through registering openings in the sections 1 and 2 of the auxiliary rim, and on the inner side of the section 1 a nut 21 is threaded on to the valve casing. The felly 11 has an opening 22 at the valve, the opening being tapering, gradually increasing in diameter outwardly, and within this opening is arranged a housing 23, the inner end of the housing extending beyond the inner surface of the felly and being threaded to receive a protecting cap 24. At the outer end the housing 23 has a marginal flange 25, which fits within an opening in the rim, and limits the inward movement of the housing. The valve casing 26 passes through this housing, the inner end extending into the protecting cap, and it will be obvious that by removing this cap, access may be had to the valve casing.

Figure 6:
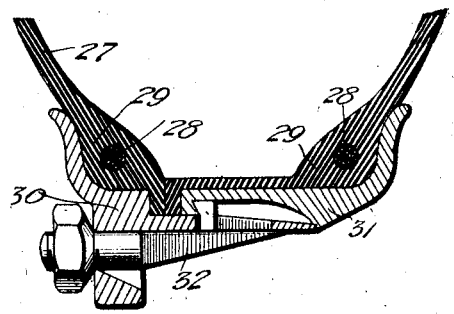
Fig. 6 is a sectional view of another embodiment of the rim.
Figure 11:
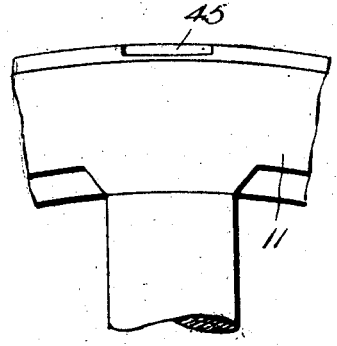
Fig. 11 is a side view of a portion of the main rim.

In Fig. 6 the auxiliary rim is shown adapted for a shoe or casing 27 having reinforcing cables 28 in the holding rib 29, the only difference between the auxiliary rim sections 30 and 31 of the present embodiment and the sections 1 and 2 of the embodiment just described is in the shape of the hooked flanges for engaging the holding ribs, the mechanism for clamping the sections together being indicated generally at 32.

In Fig. 7 the auxiliary rim sections 33 and 34 are precisely the same as sections 1 and 2, and are clamped together by the same mechanism indicated at 35. In this construction, however, the shoe or casing 36 is an ordinary shoe or casing, and has no abutting edges to be clamped together, hence an inner tube 37 is used.

In Fig. 8 the rim is shown with the auxiliary rim removed, and in Figs. 9 and 10 there is shown different mechanism for clamping the holding sections to the main rim. The lever 38 of Fig. 9 which corresponds to the lever 19 of Figs. 1 and 8, is curved as shown to fit beneath the rim 11, but the construction is otherwise the same.

In Fig. 10 the cam 40, which clamps the rim sections together, has rigidly secured thereto a head 41, of polygonal outline for engagement by a wrench to turn the cam.

In use, to demount the demountable rim the levers 19 are swung outward, to release the holding plates 12, and when the levers are so swung outward the holding plates 12 are released far enough to permit the shoulders 12$^a$ to disengage the edge of the rim and to move inward far enough to permit the demounting of the auxiliary rim. In demounting the auxiliary rim that portion of the said rim remote from the valve casing 26 is first released from the main rim, after which the valve casing may be withdrawn from the housing.

With the above described construction, an inflated pneumatic tire may be carried on a demountable rim in such manner that it may be quickly placed or removed without requiring the aid of tools, or the detachment of the valve stem, cap or other parts. It will be noticed from an inspection of Figs. 1 and 2, that the auxiliary rim is of greater internal diameter than the external diameter of the rim 10, so that it is easily placed and removed, and when in place it is entirely supported by the flanges 13.

In each of the constructions shown it will be noted that the metal rim has a groove 45 for receiving each of the bars corresponding to the bar 7, of Fig. 4. This groove has an inclined bottom wall, to fit the inclined inner face of the bar, and the purpose of the groove is to prevent creeping of the auxiliary rim and the tire. The engagement of the bar with the groove provides a lock for preventing this creeping, and also assists in truly centering the auxiliary rim upon the wheel.

Figure 12:
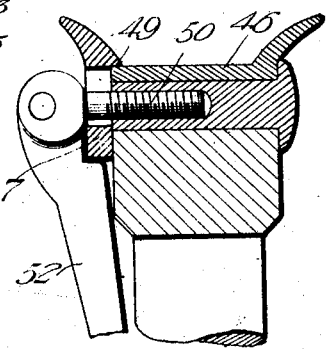
Fig. 12 is a sectional view of another embodiment of the invention.

In Fig. 12 the auxiliary rim (not shown) is supported by the main rim 46 corresponding to the rim 10 of Fig. 2, and by holding plates 47 corresponding to the plates 12 of the said figure. These plates have vertical slots 49, through which extends one section 50 of a sectional bolt to be described. This bolt consists of the section 50 and a section 51 having at one end a head for engaging the felly and the edge of the rim and having at the other an internally threaded opening for engagement by the section 50. By the provision of the slot 49 in the plate 47, it will be evident that when the section 50 of the bolt is loosened the plate 47 will drop in the same manner as the plates 12 of Fig. 2, thus releasing the auxiliary rim. The section 50 of the bolt has a lever 52 having a clamping head which operates in the same manner as the lever 19 of Fig. 2.

In the construction of Fig. 7 a gasket 37$^a$ is used between the abutting edges of the sections 33 and 34 to fill up the space and to make the tire waterproof.

The principal support for the auxiliary rim of all of the constructions shown is the wedge shaped bars 7$^a$, 32 and 35. In practice, there will be approximately twelve of these bars arranged at regular intervals, that is, the bars will be placed sufficiently near each other to prevent any tendency to flatten on the part of the auxiliary rim between the bars. Between the bars 7$^a$ the auxiliary rim rests upon the flanges 13.

I claim:

1. A demountable rim consisting of sections fitting one outside of the other and having means for limiting their movement toward each other, and means for clamping the sections of the rim together, said means comprising transverse slots on the inner section, and an inwardly extending circumferential rib on the outer section crossing the slots when the sections are in place, bolts having lugs extending through the slots and engaging the rib, the inner section having inwardly extending lugs through which the bolts extend, and means engaging the outer ends of the bolts for drawing said bolts outwardly.

2. A demountable rim consisting of sections fitting one outside of the other and having means for limiting their movement toward each other, the inner section having transverse slots, and the outer section having a circumferentially extending rib on its inner face crossing the slots, and connecting means for the sections on the inner face of the inner section, and having means extending through the slots for engaging the rib.

3. A demountable rim consisting of sections fitting one outside of the other and having means for limiting their movement toward each other, and having coöperating surfaces for engaging and sealing the edges of a shoe or casing, the inner section having transverse slots, and the outer section having a circumferentially extending annular rib crossing the slots, and means for connecting the sections arranged within the inner section and having means passing through the slots and engaging the ribs.

HENRI DANIEL REY.